(12) United States Patent
Draht et al.

(10) Patent No.: US 8,777,080 B2
(45) Date of Patent: Jul. 15, 2014

(54) HEAD PIECE FOR A SETTING DEVICE

(75) Inventors: Torsten Draht, Schloss Holte (DE); Bernd Haesler, Halle/Westfalen (DE); Carsten Löschner, Bad Lippspringe (DE); Iris Spiller-Bohnenkamp, Bielefeld (DE); Marc Steinig, Altenbeken (DE)

(73) Assignee: Böllhoff Verbindungstechnik GmbH (DE)

( * ) Notice: Subject to any disclaimer, the term of this patent is extended or adjusted under 35 U.S.C. 154(b) by 762 days.

(21) Appl. No.: 13/124,057

(22) PCT Filed: Oct. 12, 2009

(86) PCT No.: PCT/EP2009/007325
§ 371 (c)(1),
(2), (4) Date: Jul. 27, 2011

(87) PCT Pub. No.: WO2010/043363
PCT Pub. Date: Apr. 22, 2010

(65) Prior Publication Data
US 2011/0290847 A1     Dec. 1, 2011

(30) Foreign Application Priority Data
Oct. 13, 2008 (DE) .......... 10 2008 051 488

(51) Int. Cl.
*B27F 7/13* (2006.01)

(52) U.S. Cl.
USPC .......................................... 227/119; 227/149

(58) Field of Classification Search
CPC ........ B21J 15/32; B21J 15/323; B21J 15/025; B23P 19/006
USPC .................................................... 227/119, 149
See application file for complete search history.

(56) References Cited

U.S. PATENT DOCUMENTS

| | | | |
|---|---|---|---|
| 2,890,913 A | 12/1956 | Miskel at al. | |
| 3,049,713 A | 8/1962 | Dupuy et al. | |
| 3,250,451 A * | 5/1966 | Fulop | 227/149 |
| 3,275,047 A | 9/1966 | Kulman | |
| 3,973,605 A | 8/1976 | DeCaro | |
| 4,195,762 A * | 4/1980 | Burton | 227/156 |

(Continued)

FOREIGN PATENT DOCUMENTS

| | | |
|---|---|---|
| AU | 689457 | 4/1998 |
| CA | 1030368 A1 | 5/1978 |
| DE | 19704480 A1 | 8/1998 |

*Primary Examiner* — Andrew M Tecco
(74) *Attorney, Agent, or Firm* — Hiscock & Barclay, LLP

(57) ABSTRACT

The invention relates to a setting device for an auxiliary joining part, particularly a setting fastener or a punch rivet, including a driven punch which for a setting movement can be moved in a joining channel to which the auxiliary joining part can be loosely fed. The setting device includes a head piece in which a part of the joining channel runs, further including a plurality of compressed air ducts ending in the joining channel, and an exhaust air channel. The exhaust air channel ends adjacent to the front side of the punch moving the auxiliary joining part into the joining channel of the setting device such that an airflow can be generated in the joining channel in the direction of the front of the punch moving the auxiliary joining part by way of an overpressure which can be generated in the plurality of compressed air channels compared to the atmospheric pressure and by which the auxiliary joining part can be positioned on the front side of the punch.

9 Claims, 11 Drawing Sheets

(56) References Cited

U.S. PATENT DOCUMENTS

| | | | |
|---|---|---|---|
| 4,615,475 A * | 10/1986 | Fuhrmeister | 227/136 |
| 4,819,856 A | 4/1989 | Davern et al. | |
| 5,398,860 A * | 3/1995 | Edwards | 227/149 |
| 5,813,114 A * | 9/1998 | Blacket et al. | 29/809 |
| RE40,395 E * | 6/2008 | Edwards | 227/149 |
| 7,475,468 B2 | 1/2009 | Mauer et al. | |
| 2002/0108995 A1 | 8/2002 | Hempfling et al. | |
| 2010/0163595 A1 | 7/2010 | Draht | |

\* cited by examiner

HEAD PIECE FOR A SETTING DEVICE

CROSS REFERENCE TO RELATED APPLICATIONS

Pursuant to 35 USC §371, this application is a National Stage of International Application No. PCT/EP2009/007325, filed Oct. 12, 2009, which claims priority to German Patent Application No. 10 2008 051 488, filed Oct. 13, 2008 under applicable paragraphs of 35 USC §119, wherein the entire contents of each above-noted document is herein incorporated by reference.

FIELD OF THE INVENTION

The present invention relates to a head piece for a setting device and a setting device equipped with this head piece, particularly for joining a setting bolt or a punch rivet.

BACKGROUND OF THE INVENTION

Various versions of head pieces for setting devices are known in the prior art. Such head pieces contain a joining channel through which the auxiliary joining part is joined using the punch of the setting device. Auxiliary joining parts are setting fasteners or punch rivets, for example.

Before the auxiliary joining part is placed in a component, it is moved through the joining channel in the head piece. Therefore, the head piece is used, for example, for braking or positioning of the auxiliary joining part so that it can be optimally placed by the punch of the setting device. For this purpose, a braking path, which is comprised of two half shells, is known from DE 297 19 744. These half shells form a part of the joining channel. The half shells at their one end are fastened so as to pivot, and at their other end are connected together via spring rings so that an auxiliary joining part moving through the joining channel is braked due to friction. The document, EP 0 746 431 B1, describes a head piece in which spring preloaded spheres project into the joining channel. The auxiliary joining part is retained at these spheres so that it can be taken along out of this retaining position by the punch for the setting process. This sphere arrangement has the disadvantage that with rapid setting movements of the auxiliary joining part, these spheres are subjected to strong acceleration forces which leads to uneconomical wear of this arrangement.

The document, EP 0 387 430 A2, discloses the arrangement of multiple sleeve-like elements whose resilient fingers narrow the joining channel. These resilient fingers catch an incoming auxiliary joining part and position it so that later it can be moved along by the punch of the setting device. The document, DE 197 04 480 A1, similarly describes the arrangement of a sphere construction in the joining channel, in order to influence the movement of the auxiliary joining part in the joining channel. The disadvantages described above, apply here too.

The document, DE 10 2008 018 428, describes a joining channel having a braking path. This braking path is comprised of multiple webs extending in the longitudinal direction of the joining channel that project into the joining channel preloaded by a spring. This braking path catches an auxiliary joining part that is fed loose to the setting device or joining channel, in order to then be carried along by the punch of the setting device during the setting or riveting process.

The object of the invention is to provide a head piece for a setting device and a setting device having this head piece that supports both the positioning of the auxiliary joining part beneath the punch of the setting device as well as an optimal feed of the auxiliary joining part for the join location.

SUMMARY OF THE INVENTION

The above object is achieved by a head piece, a setting device, and a setting method according to the claims.

The inventive head piece for a setting device comprises a joining channel, which extends in the longitudinal direction of the head piece. The head piece has the following features: an inner hollow cylinder in which the joining channel runs, a plurality of braking webs that are movable and extend radially spring preloaded into the joining channel, and a casing tube that encloses the inner hollow cylinder so that springs for the preloading of the braking paths are held between the inner hollow cylinder and the casing tube.

The present invention yields a compact design of a head piece having braking paths. This braking path is comprised of braking webs, spring preloaded into the interior of the joining channel, that are preloaded and held by a specific spring arrangement. The springs for the preloading of the braking webs are disposed and clamped between the inner hollow cylinder and the casing tube of the head piece. This results in increased stability and also an adapted spring behavior of the clamped springs because these springs cannot yield at will into a free space. Instead, with mechanical loading, the yielding of the springs is restricted by the clamping casing tube. This has a positive effect particularly during high speed joining of auxiliary joining parts because a resilient rebound of the auxiliary joining part is reduced by the braking webs.

For the advantageous design of the head piece, the springs are configured so that the braking web can be deflected damped, and can be reset delayed into its initial position. In this manner the spring initially absorbs a lateral impact of a setting fastener and its energy, and returns this energy temporally delayed in comparison to a standard steel spring. As a result, the braking web does not spring back immediately into its initial position, rather returns temporally delayed. According to a further embodiment, the springs of the head piece are configured so that the braking web can be deflected with a progressive spring characteristic, and can be reset damped into its initial position. As a result, the deflected braking web during its radially outward directed movement experiences an increasing spring resistance as a counteracting force. The reset of the braking web is damped so that the braking web does not immediately spring back in the joining channel. In this manner, the energy absorbed by the braking web from the setting fastener is returned delayed to the setting fastener. The spring behavior described here is preferably implemented for all spring configurations described here, that is, for the springs or O-rings in the same manner as for the spring loaded channel segments have a damping layer (see below).

According to a preferred design of the head piece, the inner hollow cylinder has a plurality of channels opening into the joining channel that can be connected via the casing tube to the environment or to a compressed air source.

The channels opening into the joining channel are used to create a directed air stream counter to the setting movement of the auxiliary joining part in the joining channel. This directed air stream is generated either by suction of air out of the head piece of the setting device, or by blowing compressed air in through the channels into the joining channel in the direction of the setting device. Due to the air stream, the auxiliary joining part is pressed against the front side of the punch of the setting device, so that the auxiliary joining part is prepositioned in this manner. If the punch of the setting device starts the setting process, the auxiliary joining part is taken along by the punch, without the auxiliary joining part rushing ahead of the punch movement. In this manner, the movement of the auxiliary joining part is better controlled during the setting process.

According to a further design of the present head piece, it has a connection end for connecting to a setting device. In addition, its braking webs are disposed in each case in a continuous longitudinal groove the inner hollow cylinder, and are fastened there by means of pins provided in the end regions of the braking webs. This type of fastening of the braking webs guarantees a free movement of the braking webs in the radial direction, and sufficient mechanical stability of the braking webs within the head piece during the setting movement of the punch.

According to a further preferred embodiment of the present invention, the springs used in the head piece are composed of plastic or rubber O-rings, which are clamped between the casing tube and the outer wall of the inner hollow cylinder, so that their spring behavior can be changed, compared to the unclamped state.

The targeted clamping of the O-rings, which are composed of plastic or rubber, reduces the elastic behavior of the spring preloaded braking webs. In this manner, a rebounding of the auxiliary joining part during the joining process is reduced because the radial yielding and spring back of the braking webs is slower, and occurs with a greater loss of energy compared to steel springs, for example.

In addition, it is preferred to combine several O-rings into spring packets so that the braking webs are held with three equally spaced spring packets.

A further inventive head piece for a setting device having a joining channel has the following features: a casing tube, an inner hollow cylinder, in which the joining channel runs, and which is formed by a plurality of channel segments subdivided in the longitudinal direction, and a damping layer, which is disposed between the inner hollow cylinder and the casing tube, so that the channel segments are damped in the radial direction and can be moved so as to be reset in a spring loaded manner.

In comparison to the previously discussed braking webs, the channel segments guarantee a support of the auxiliary joining part at any location, also including changing locations, within the joining channel during the setting procedure. This reduces wear, for example, of the auxiliary joining part and channel segment during the setting procedure. A further advantage consists in the areally disposed damping layer, at which the individual channel segments are supported. Due to the areal arrangement of the damping layer, not only is the radial yielding of the channel segments cushioned, but the channel segments are supported three-dimensionally due to this damping layer.

It is preferable to produce the channel segments from wear resistant materials, preferably from plastic, hardened steel or ceramics. In addition, according to one embodiment the damping layer is composed of plastic, preferably an elastomer. It is further preferred to subdivide the inner hollow cylinder into three to five channel segments which are supported hanging or standing in the head piece.

The present invention discloses in addition, a setting device for an auxiliary joining part, particularly setting fasteners or punch rivets, having a driven punch which for a setting movement is movable in a joining channel that can be fed the loose auxiliary joining part. The setting device has the following features: a head piece, in which a part of joining channel runs, and a suction arrangement having a suction channel which opens into the joining channel of the setting device adjacent to the punch face side moving the auxiliary joining part, so that by means of a negative pressure, compared to the atmospheric pressure, that can be generated in the suction device, an air stream can be generated in the direction of the punch face side moving the auxiliary joining part with which the auxiliary joining part can be positioned at the punch face side.

In the present setting device, the auxiliary joining part is fed loose into the joining channel beneath the joining punch face side. Therefore, the auxiliary joining part is located without support in the joining channel, and remains in the channel, or is moved up to the braking web. To now attain a precise positioning of the auxiliary joining part at the joining punch face side, a directed air stream is generated in the joining channel in the direction of the joining punch face side. This air stream is a result of a negative pressure generated in a suction arrangement that suctions the air out of the joining channel adjacent to the joining punch face side. As a result of this directed air stream, the auxiliary joining part is pressed with its head against the joining punch face side, and is held in this position. Thus, the auxiliary joining part is appropriately positioned for the setting procedure, and is taken along by the punch during the setting movement, without rushing ahead of the punch. This increases control during the setting procedure and increases the quality of the created join connections compared to the prior art.

In addition, the present invention comprises a setting device having the following features: a head piece, in which a part of the joining channel runs that comprises a plurality of compressed air channels opening into the joining channel, and an exhaust channel that opens in the joining channel of the setting device adjacent to the punch face side moving the auxiliary joining part, so that in the joining channel by means of an over-pressure, in comparison to the atmospheric pressure, that can be generated in the plurality of compressed air channels, an air stream can be generated in the direction of the punch face side moving the auxiliary joining part with which the auxiliary joining part can be positioned at the punch face side.

With this design of the setting device, the auxiliary joining part is not positioned within the joining channel by means of an air stream generated by negative pressure, rather by a directed air stream generated by means of overpressure in comparison to the atmospheric pressure. Because the direction of the air stream and its effect are the same, as was already described above, reference is made to the above embodiment. Here, the type of generation of the air stream occurs in a different manner than in comparison to the setting device described above. A source of compressed air is connected to the plurality of compressed air channels in the joining channel or head piece. On this basis, air having an overpressure in comparison to the atmospheric pressure can be blown into the joining channel that can exit again through a corresponding exhaust channel adjacent to the joining punch face side. Using this directed air stream, the auxiliary joining part can be positioned at the joining punch face side in the same manner as was already described above.

According to a preferred embodiment, the setting devices described above are combined with a head piece whose joining channel has a hollow cylinder shape having an inside and an outside. The inside, for tapering the joining channel over a specific length, is composed of a plurality of braking webs, spring preloaded and projecting in the radial direction into the joining channel. In a further design, the head piece comprises at least four, preferably five or six of these braking webs, that each have the same length and are disposed uniformly distanced and concentrically about the center of the hollow cylinder channel.

The present invention comprises furthermore, setting devices in combination with the different head pieces described above.

According to a further design of the setting devices described above, these comprise a joining channel in the head piece whose diameter is dimensioned so that a gap of 0.1 to 0.5 mm results between the maximum cross section of the auxiliary joining part and an inner wall of the joining channel. Based on this dimensioning, a gap width of 0.1 to 0.5 mm results between the auxiliary joining part and the inner wall of the joining channel. This small gap dimension makes it possible that an auxiliary joining part is positioned and/or braked in a head piece solely by a directed air stream generated by means of a suction device or compressed air connection. With this configuration, it is therefore not necessary to provide an additional braking path within the head piece having a small gap dimension; however, this can be optionally implemented as well. The springs in the head piece of the setting device are configured so that the braking web(s) can be deflected with a progressive spring characteristic, and can be reset damped into its initial position, as was already described above.

DETAILED DESCRIPTION OF THE DRAWINGS

Preferred embodiments of the present invention are explained in more detail in the accompanying drawings, in which.

DETAILED DESCRIPTION

Figure 4:
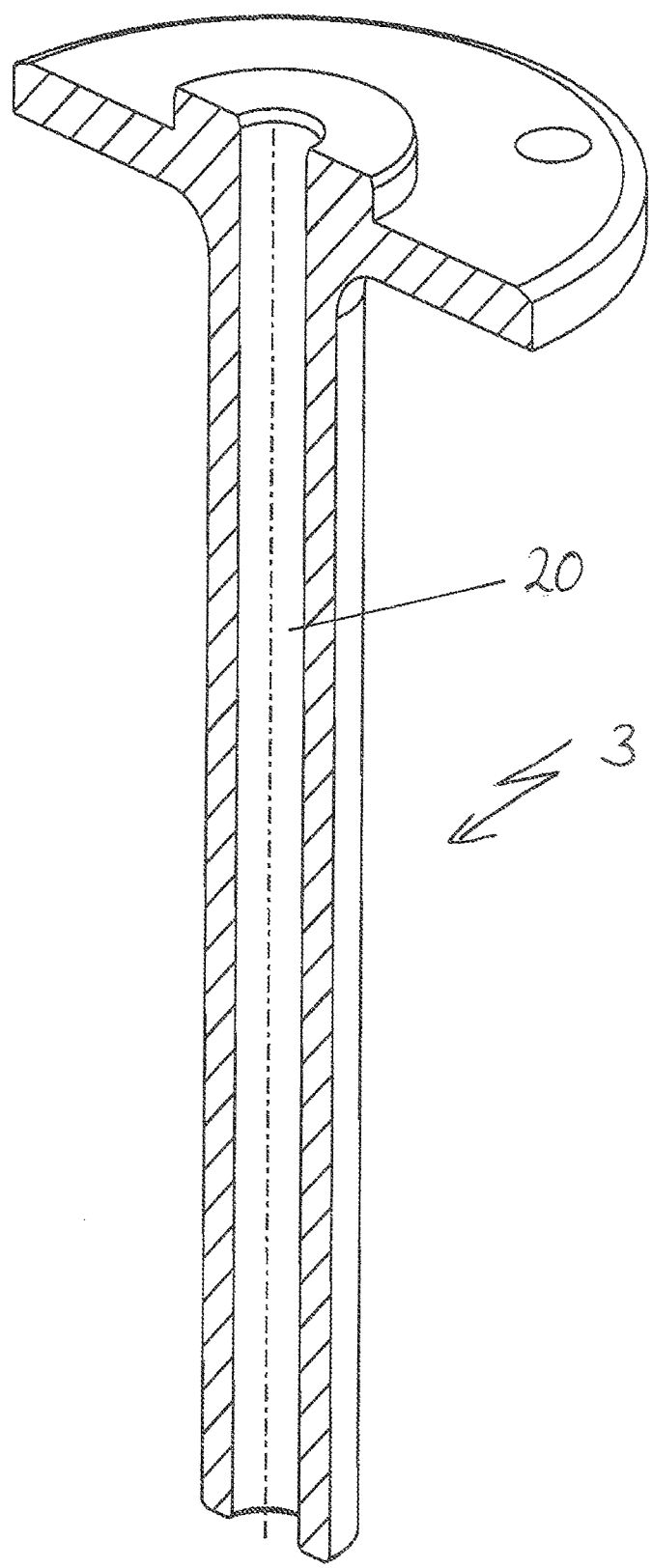
FIG. 4 is a sectional view of the head piece of FIG. 3.

The present invention describes a setting device 1 for joining auxiliary joining parts B, such as a setting fastener or a punch rivet, for example. This is represented in a section in FIG. 1. The auxiliary joining part B is accelerated via a driven punch 10 and specifically by its joining punch face side 13, and joined into a component (not shown). For this purpose, the auxiliary joining part B, which is subsequently referred to as setting fastener B, is fed loose into a joining channel 20 through which the punch 10 moves. A loose feeding of the setting fastener B means that it is not held by a tape or similar, rather is loose in the joining channel 20. The joining channel 20 extends partially into the setting device 1 and partially into a head piece 3. The setting device S is represented by means on an example in FIG. 4. It comprises a drive 2, the magazine 1, a head piece 5 having a joining channel and a drive 7 for the magazine 1. The magazine 1 is disposed between the drive 2 and the head piece 5 of the setting device S, so that joining elements are fed directly out of the magazine 1 to the head piece 5, in order to join them there by means of the punch (not shown) of the setting device S. The magazine 1 comprises a base element 10 having a covering 30. A connection module 15, to which the provisioning module B can be coupled, is provided at the base element 10. The magazine 1 is shown in greater detail in FIGS. 5 and 6.

The head piece 3, as will be described in different constructions, alone and/or in combination with the setting device 1, implements a positioning of the setting fastener B at the punch face side 13 moving the setting fastener. For this purpose, the setting fastener B is positioned at this punch face side 13 by an air stream directed onto the moving or joining punch face side 13. Thereby, the setting fastener B, with its side of the head facing away from the shaft, lies against the punch face side 13 and is thereby correctly aligned. The setting fastener is thereby in a coaxial alignment with the longitudinal axis of the punch 10 and of the joining channel 20 in the head piece 3. This corresponds to the alignment of the setting fastener as with the use of feed tapes having the setting fastener attached therein. It is advantageous here that the positioning can be implemented even with a loose feeding of the setting fastener, while the setting device 1 can be used in a normal position as well as in an overhead operation.

In order to support a position stable movement of the setting fastener B through the joining channel 20 of the headpiece 3, the head piece is optionally equipped with a braking path 40; 50, as is described in more detail below. The braking path 40, 50 brakes the setting fastener B during its movement through the joining channel 20 so that its contact at the punch face side 13, and with it the alignment of the setting fastener, is supported for the joining. For this purpose, braking webs 42 (see FIGS. 1 to 9) or channel segments 52 (see FIG. 10, 11) of the joining channel 20 in the head piece 3 are spring preloaded damped radially inward into the joining channel 20. For improved braking compared to the prior art, each braking path 40, 50 is preloaded radially into the joining channel 20 such that the braking webs 42 or channel segments 52 can be moved damped radially outward by an incoming setting fastener B. The reset of the braking webs 42 or the channel segments 52 into their initial position occurs temporally delayed so that the setting fastener B does not receive a radially directed impulse from this reset movement. According to one embodiment, preferred in this respect, the springs of the headpiece, or of the setting device, are configured with a specific headpiece so that a plurality of braking webs or channel segments 52 can be deflected with a progressive spring characteristic, and can be reset damped into their initial position. In addition, the setting fastener is led to the center of the feeding channel 20 by the inclined alignment of the braking webs 42 or of the channel segments 52. In this manner, tumbling movements of the setting fastener B during high speed joining are reduced. For constructive implementation of the properties described above, a casing tube is used, that is described in more detail below. The aim of the casing tube, along with other functions, is to limit the radial deflection movement of the braking webs, which according to one alternative are spring preloaded plastic O-rings. Using the casing tube, the deflection movement is limited with low constructive costs, in an effective manner and without temporal delay. In addition, a vibration damped return of the braking webs into the joining channel is guaranteed due to the enclosure and the arrangement of the plastic O-rings between the joining channel and the casing tube, whereby the overall vibration of the braking webs is minimized.

In comparison to a disclosed ordinary steel spring, here a damped and delayed resetting spring preloading of the braking webs 40, 50 is used. This is implemented by different constructions, as described in more detail below.

Figure 3:
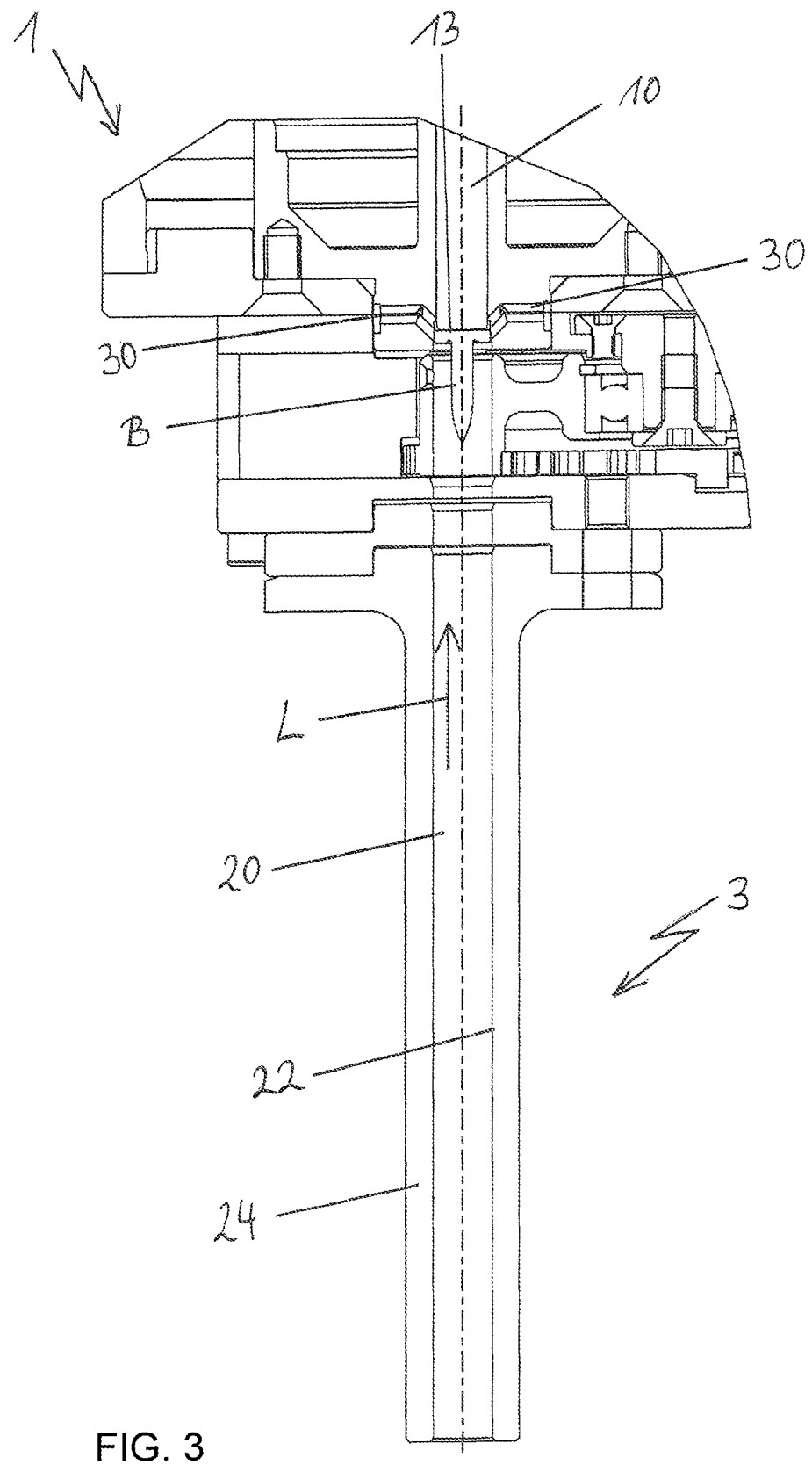
FIG. 3 depicts a further embodiment of a setting device with head piece.

FIG. 3 shows the setting device 1 with head piece 3 and without braking paths. The inner diameter of the joining channel 20 in the head piece 3 is dimensioned in comparison to the maximum cross-section of the setting fastener B so that in comparison to the maximum cross-section of the setting fastener, only a free gap having a small gap width arises between the setting fastener B and the inner wall 22 of the joining channel 20. This gap width extends in an interval between 0.1 to 0.5 mm. Preferably, the gap width is adjusted to 0.2 to 0.3 mm. Due to this dimensioning of the joining channel 20 in the head piece 3, the setting fastener B is fed tightly in this joining channel 20. In addition, suction of the air out of the joining channel 20, as described in detail below, is supported, because due to the small gap width between the punch face side 13 and the head of the setting fastener B, a negative pressure develops more rapidly than would be the case for a gap of a larger width.

In the setting device 1, the setting fastener B is fed loose into the joining channel 20. This occurs, for example, using a design as is described in the patent application DE 10 2007 017 689. With this, the setting fastener is fed into the joining channel 20 above the head piece 3. It is also preferred to feed the setting fastener B into the joining channel 20 in the head piece 3.

The setting device 1 comprises a channel 30 that opens into the joining channel 20 adjacent to or near the punch face side 13. The channel 30 is connected to a suction device (not shown). The suction device creates a negative pressure in comparison to the atmospheric pressure, so that using the channel 30, which is used here as a suction channel, air is suctioned out of the joining channel 20. This creates a directed air stream L within the joining channel 20 that is directed onto the punch face side 13. The strength of the air stream L can be adjusted using the amount of the negative pressure so that the setting fastener B is pressed by the air stream against the rams face side 13, and positioned there. The small gap dimension between the setting fastener and the inner wall of the joining channel 20 (see above) supports the positioning of the setting fastener B at the punch face side 13, because the air fed through the gap between the setting fastener and the wall of the joining channel 20 is minimized. It is also preferred to provide channels at the end of the head piece 3 facing toward the setting device 1, which open into the joining channel 20. This is exemplified in another embodiment shown in FIG. 5, where these channels are designated with the reference number 62. These channels are connected to a source of compressed air so that compressed air can be blown into the joining channel 20 in the direction of the punch face side 13. By blowing air into the joining channel 20 using an adjustable overpressure in comparison to the atmospheric pressure, the air stream L for the positioning of the setting fastener B is generated or supplemented. Therefore, the setting fastener B can also be positioned by a combined suctioning via the channel 30, and blowing in compressed air via additional channels in the joining channel 20.

Figure 1:
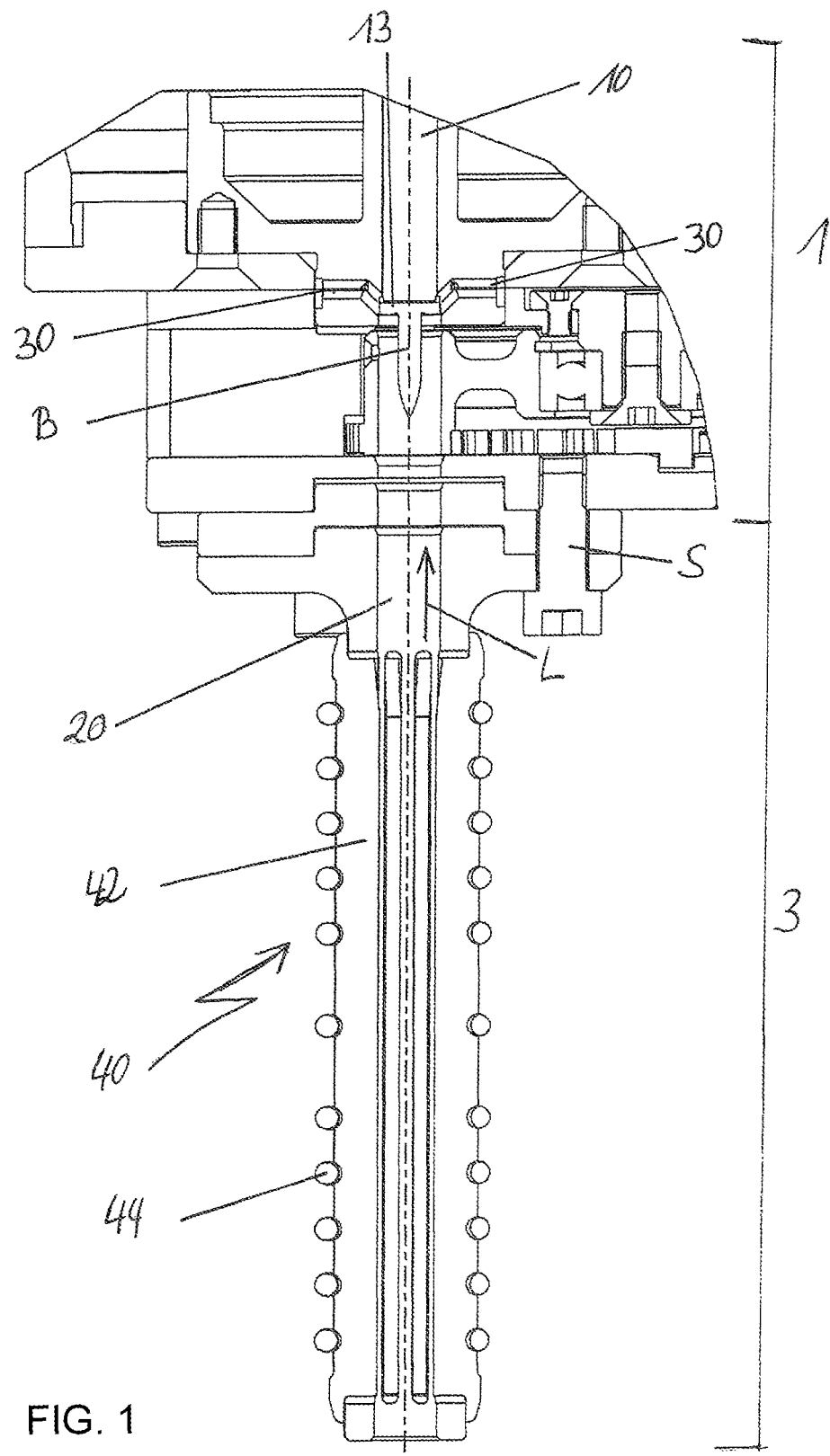
FIG. 1 depicts a setting device with head piece and braking path in accordance with a first embodiment.
Figure 2:
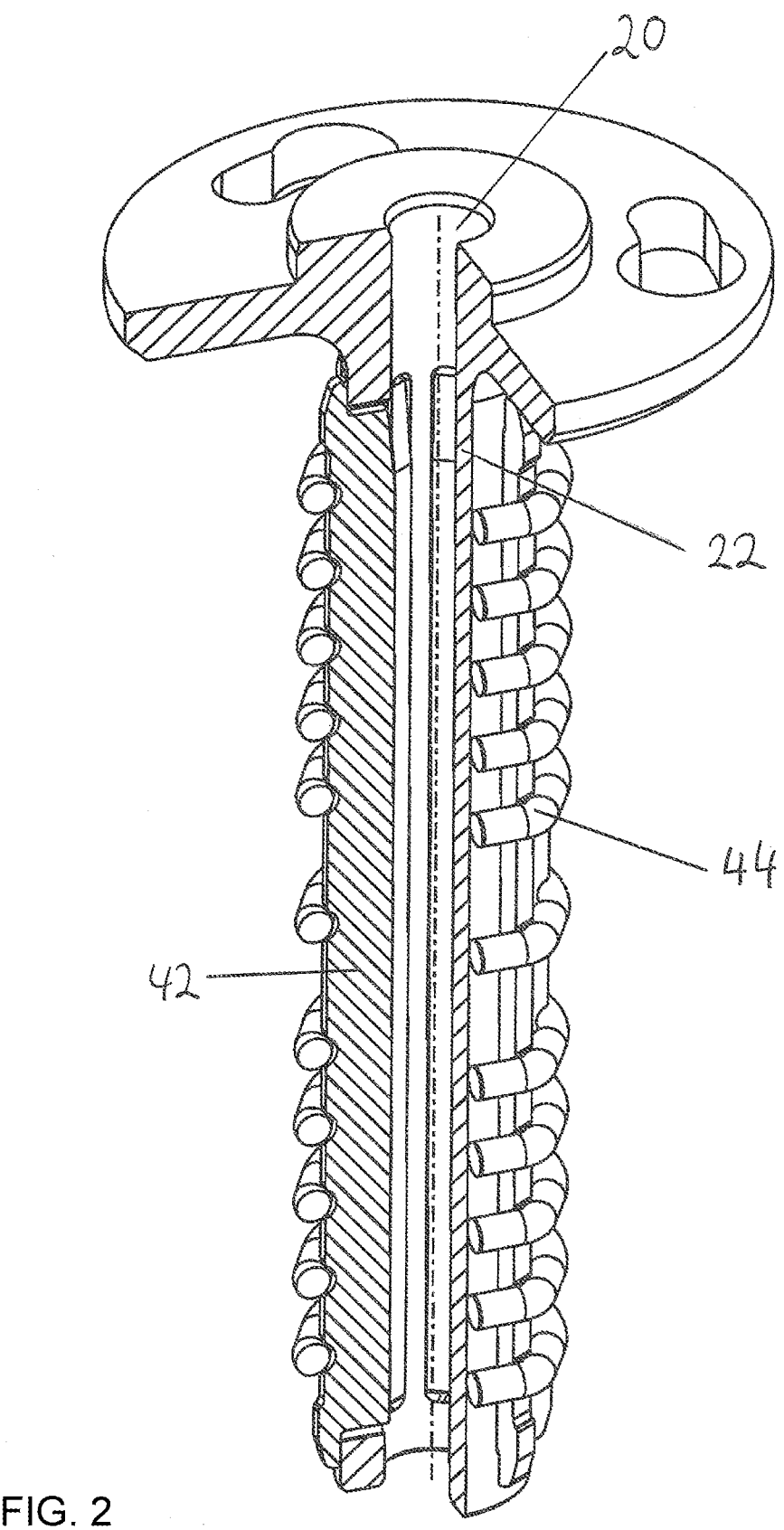
FIG. 2 is a sectional view of the head piece of FIG. 1.

FIGS. 1 and 2 show a preferred embodiment of a setting device 1 having a head piece 3 that has a braking path. Here, the setting fastener B was already fed loose into the joining channel 20. Air is suctioned out of the joining channel 20 via the suction channel 30 that is connected to the suctioning device (not shown). The air stream L which is generated in the joining channel 20 due to the generated negative pressure in comparison to the atmospheric pressure, positions the setting fastener B at the punch face side 13.

Figure 5:
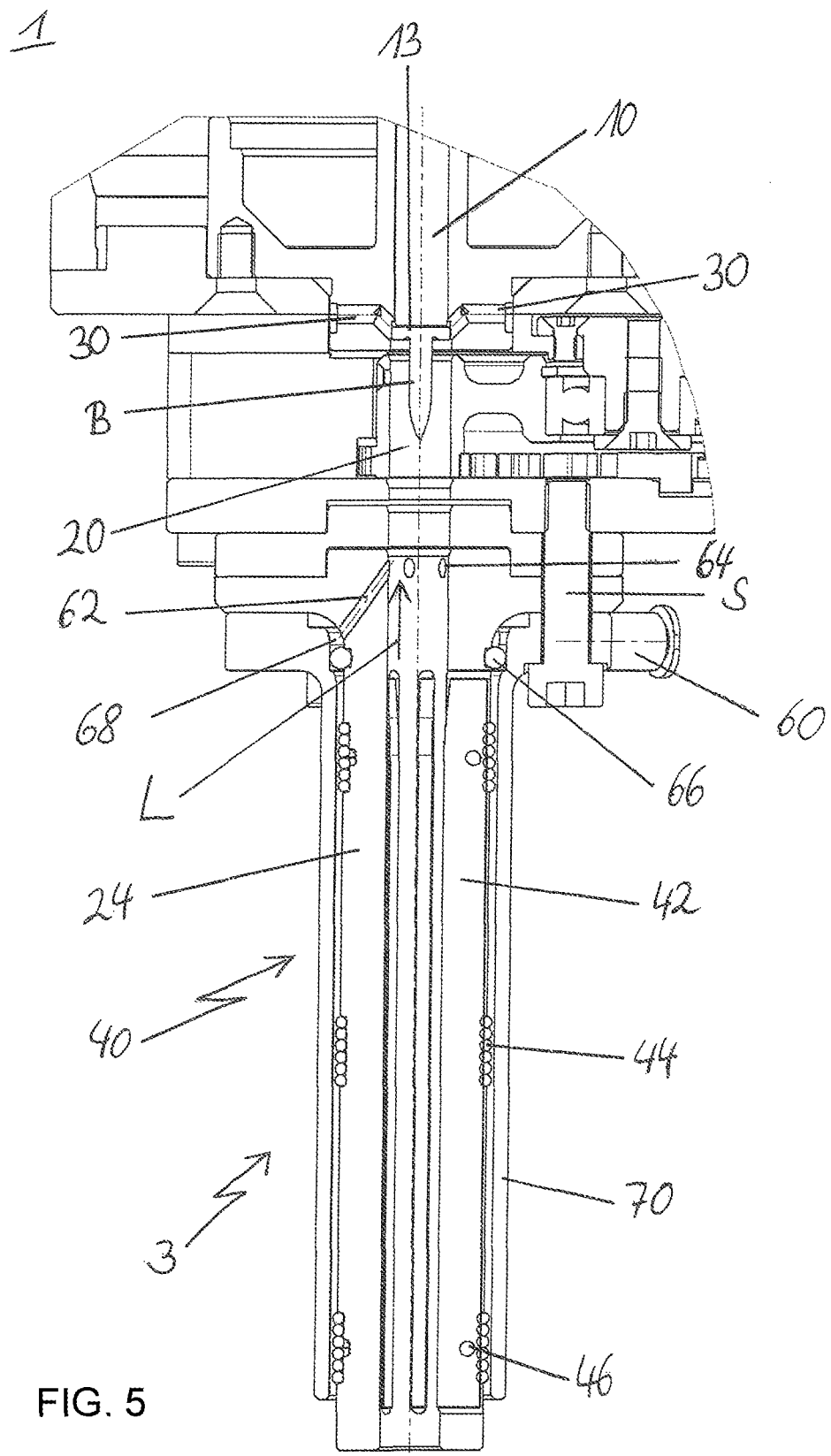
FIG. 5 depicts a further setting device with a head piece.
Figure 6:
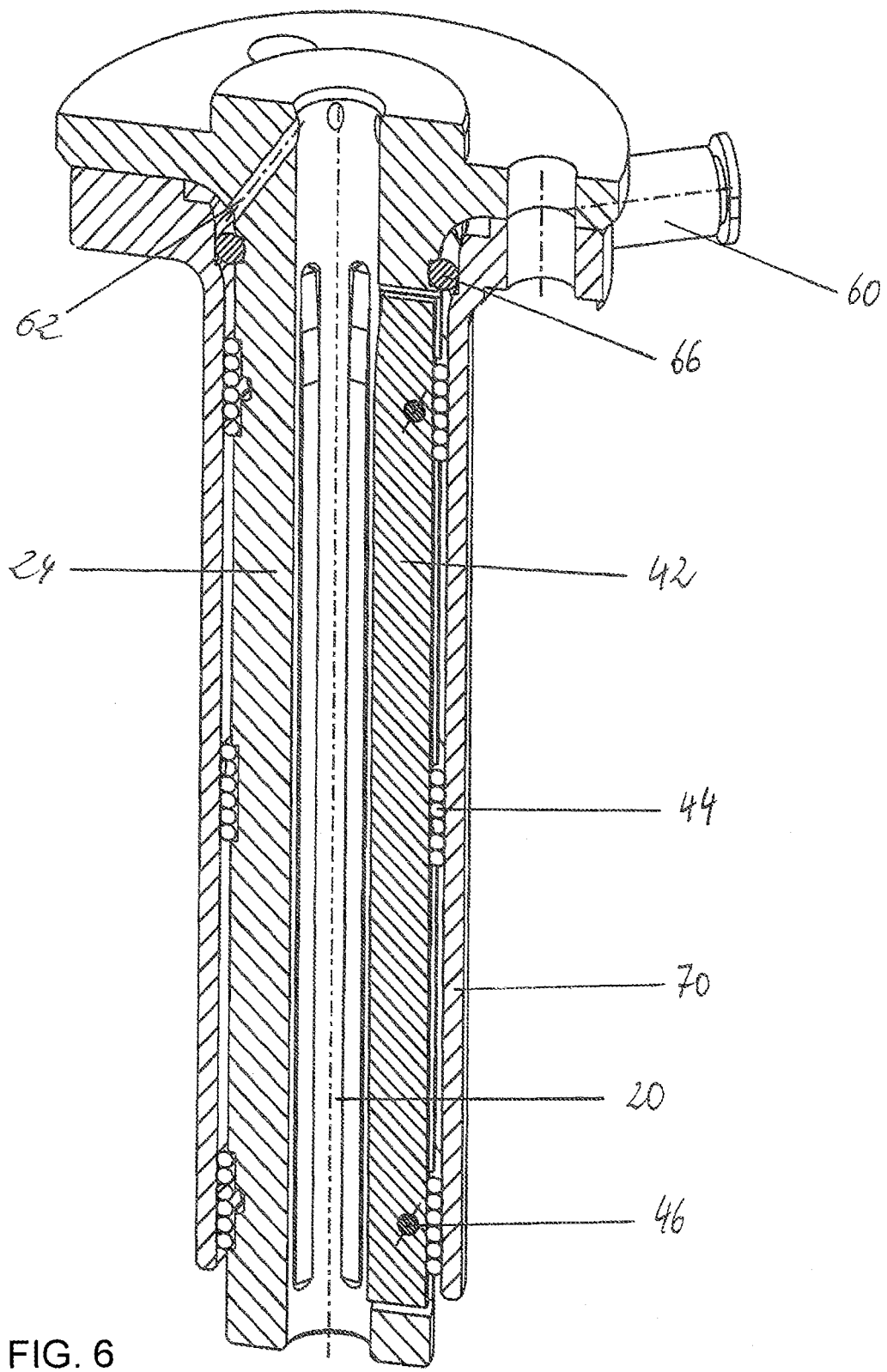
FIG. 6 is a sectional view of the head piece of FIG. 5.
Figure 7:
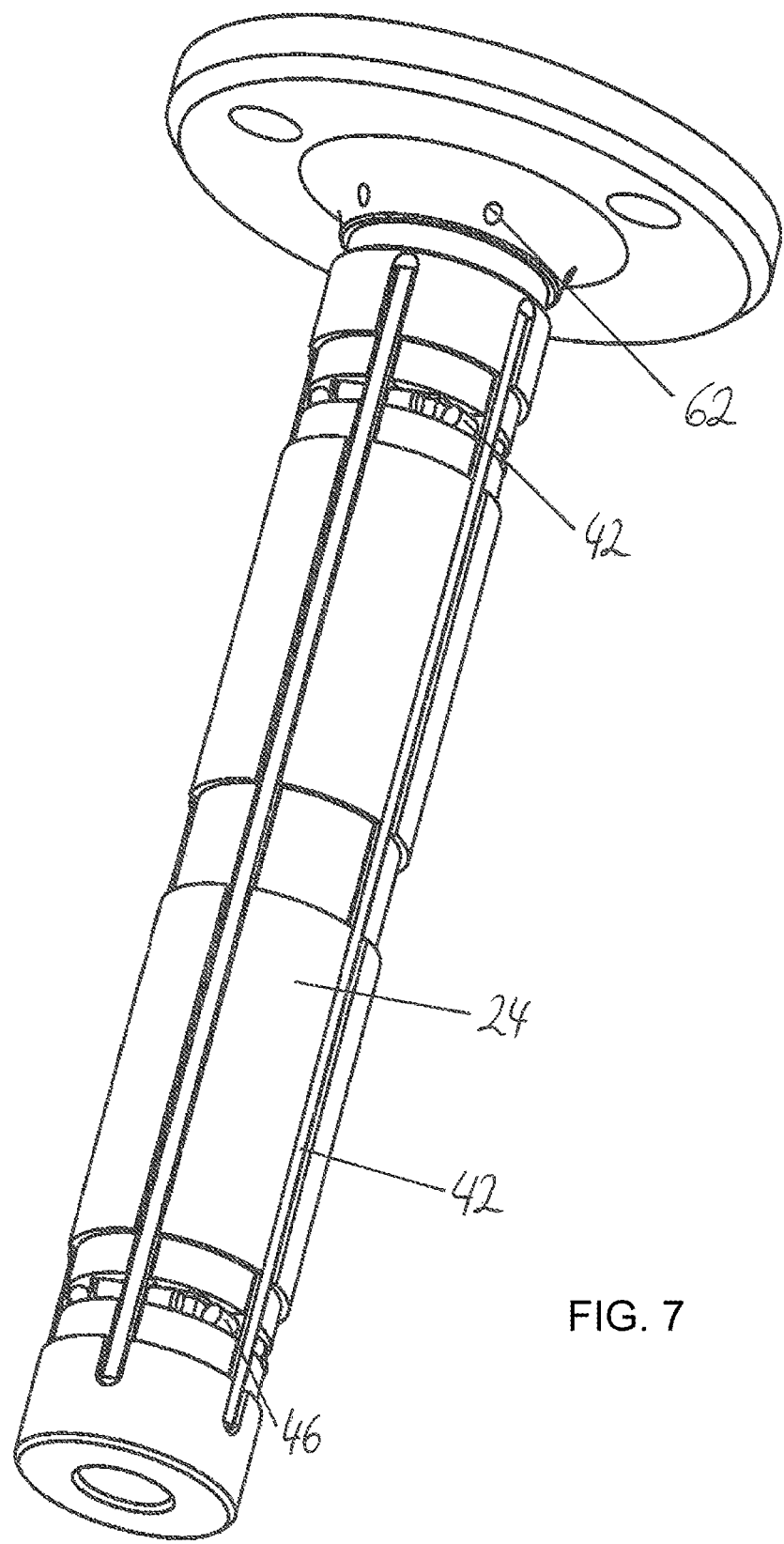
FIG. 7 is a perspective exterior view of a portion of the head piece from FIG. 5.
Figure 8:
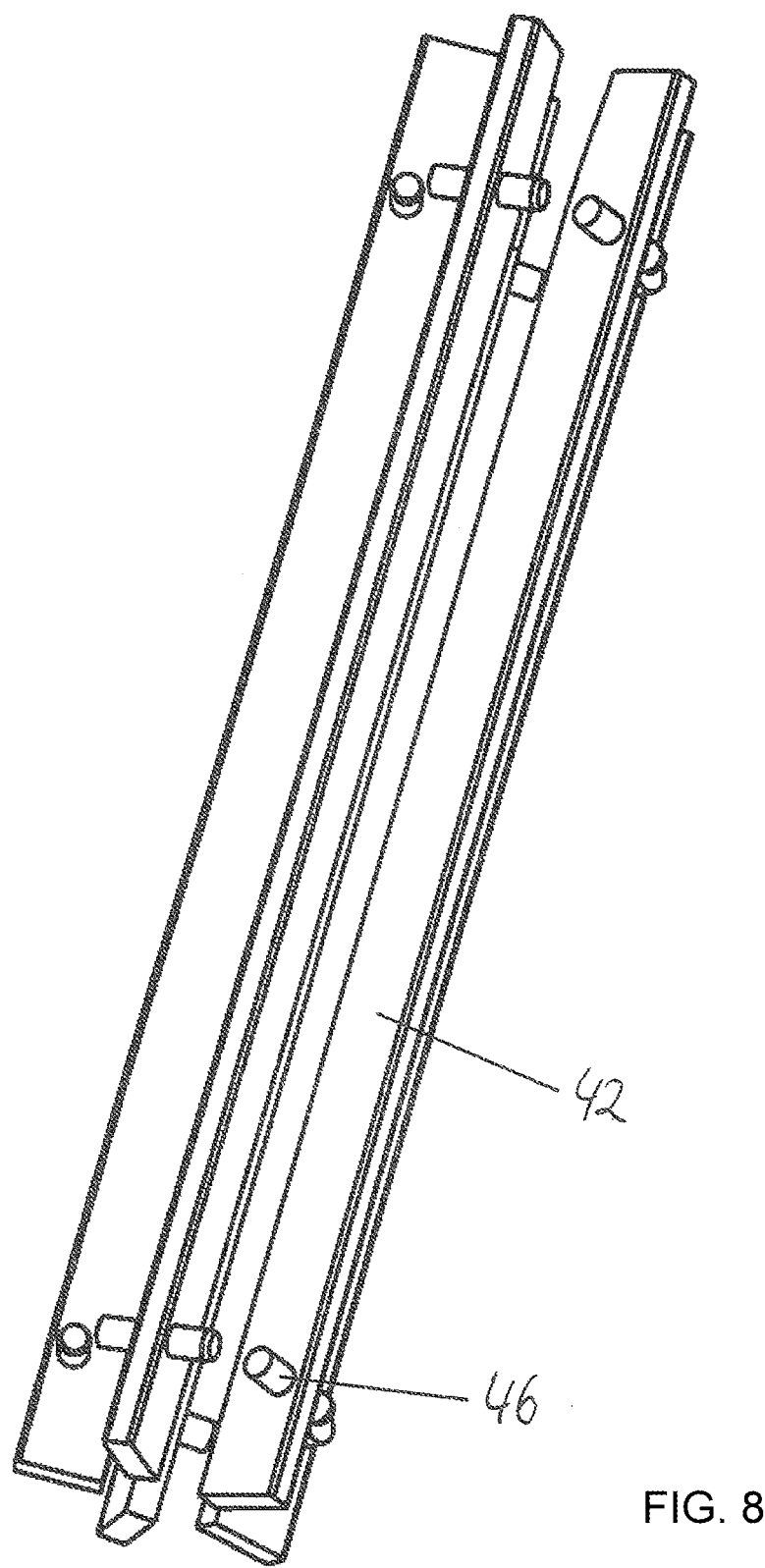
FIG. 8 depicts the braking webs in a perspective view of the head piece of FIG. 5.
Figure 9:
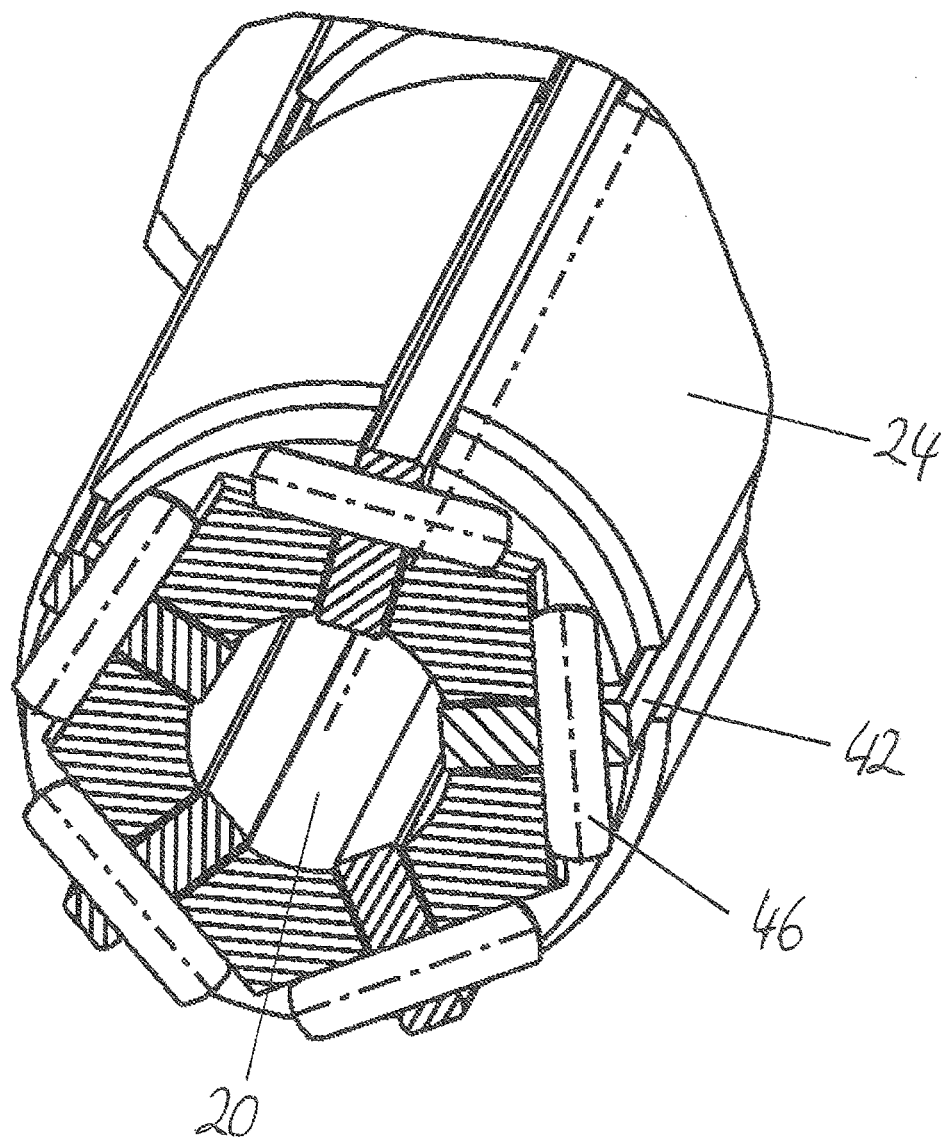
FIG. 9 is an additional perspective detail view of the head piece of FIG. 5.

It is also preferred to equip the head piece 3 of FIGS. 1 and 2 with additional channels, as shown in FIG. 5, for instance, and described in connection with this. These channels guarantee the inflow of compressed air into the joining channel 20, in order to position the setting fastener at the punch face side 13 using an air stream L generated over it.

The head piece 3 comprises a hollow cylinder 22 in whose interior the joining channel 20 extends. In the longitudinal direction of the hollow cylinder 22, multiple grooves, uniformly distanced about the circumference, are formed in which individual braking webs 42 are disposed. These braking webs 42 project radially into the joining channel 20 and thereby taper the joining channel 20. These braking webs 42 are spring preloaded directed radially inward via the springs 44. The springs 44 are preferably uniformly distanced from each other and distributed over the entire length of the braking webs. According to a preferred embodiment, the head piece 3 comprises at least four braking webs which each have the same length and are disposed concentrically about the center of the joining channel 20. For improved feeding of the setting fastener B in the joining channel 20, it is further preferred to provide five or six braking webs.

The braking webs 42 of the head piece 3 are pretensioned using the springs 44. As springs, spiral springs, a plurality of spring rings, preferably O-rings composed of plastic or rubber, as well as wormed springs can be used, for example. According to a further preferred embodiment, the springs 44 are configured so that the braking web 42 can be deflected damped radially outward and its return into its initial position is delayed. Due to this spring behavior, which can be attained using plastic O-rings, for example, the lateral movement of the setting fastener B in the joining channel 20 is damped, and no new laterally inward direct impact is applied to it via braking webs 42 springing back. This guarantees a stable movement of the setting fastener B through the joining channel 20. In addition, the damping behavior of the springs 44 is adjusted so that the braking webs 42 do not spring so far radially outward due to the impact of the setting fastener B that they lose the contact to the setting fastener B. In this manner, improved guidance of the setting fastener B is guaranteed in the joining channel 20. According to a further preferred embodiment, the braking webs can be deflected with a progressive spring characteristic and can be reset, damped into their initial positions. This results in the fact that the deflected braking web during its movement experiences an increasing spring resistance as a counteracting force. The reset of the braking web is damped so that the braking web does not immediately spring back in the joining channel. In this manner, the energy absorbed by the braking web from the setting fastener is returned delayed to the setting fastener. The spring behavior described here is preferably implemented for all spring configurations described here, that is, for the springs or O-rings in the same manner as for the channel segments (see below) spring loaded with a damping layer.

A further preferred embodiment of the setting device 1 with head piece 3 is represented in FIGS. 5 to 9. The setting device 1 comprises the channel 30, which is used here as an exhaust channel. The head piece 3 is connected to the setting device 1 by means of a screw S, for example.

The head piece 3 is comprised of a casing tube 70, an inner hollow cylinder 24, and a plurality of braking webs 42, which are preloaded radially into the joining channel 20 by means of springs 44. A compressed air connection 60 is provided at the head piece 3 which is connected to a compressed air source (not shown). Air is supplied via the compressed air connection 60 to an air reservoir 68, and from there via a plurality of compressed air channels 62 to the joining channel 20. The compressed air channels 62 are preferably disposed inclined in the direction of the setting device 1, so that the air is blown into the joining channel 20 onto the setting device 1. A seal 66 is provided in order to seal the air reservoir 68 located between the hollow cylinder 24 and the casing tube 70. If compressed air having an adjustable overpressure in comparison to the atmospheric pressure is blown into the joining channel 20, and flows out via the channel 30, the positioning air stream L arises in the direction of the punch face side 13. This air stream L positions the setting fastener B at the punch face side 13, as was already described above in connection with the suction device.

The braking webs 42 are disposed in longitudinally directed grooves within the hollow cylinder 24, and project into the joining channel 20. The webs have a lead-in chamfer at their end facing the setting device 1. This lead-in chamfer creates a soft entry of the setting fastener B into the braking path of the head piece 3.

The braking webs 42 are fastened preferably using pins 46, disposed perpendicularly to the longitudinal axis of the respective braking web 42, and are guided so they can slide radially in a groove of the hollow cylinder 24. In addition, these pins 46 are disposed only in both end regions of the respective braking webs 42. The braking webs 42 are preloaded by springs 44. The springs are not disposed distributed over the length of the braking webs 42, rather combined into spring packets. The spring packets are uniformly distanced from each other and preferably three spring packets are used for preloading the braking webs 42. The springs 44 or the spring packets are held, preferably clamped, between the hollow cylinder 24 and the casing tube 70. The springs 44 used here also have the spring properties described above. According to this, they implement a damped yielding of the braking webs 42 and a delayed restoring of the braking webs 42 into their initial position. This is implemented by the use of O-rings composed of rubber or plastic, for example, as springs 44 that are fastened clamped between the hollow cylinder 24 and the casing tube 70. Due to the casing tube 70, the braking strips/O-rings are limited in their radial deflection. In addition, it is guaranteed that the braking webs return quickly and vibration-damped into the joining channel 20, and the overall vibration of the braking webs is minimized. Using the casing tube, the deflection movement is limited with low constructive costs, in an effective manner and without temporal delay.

Figure 10:
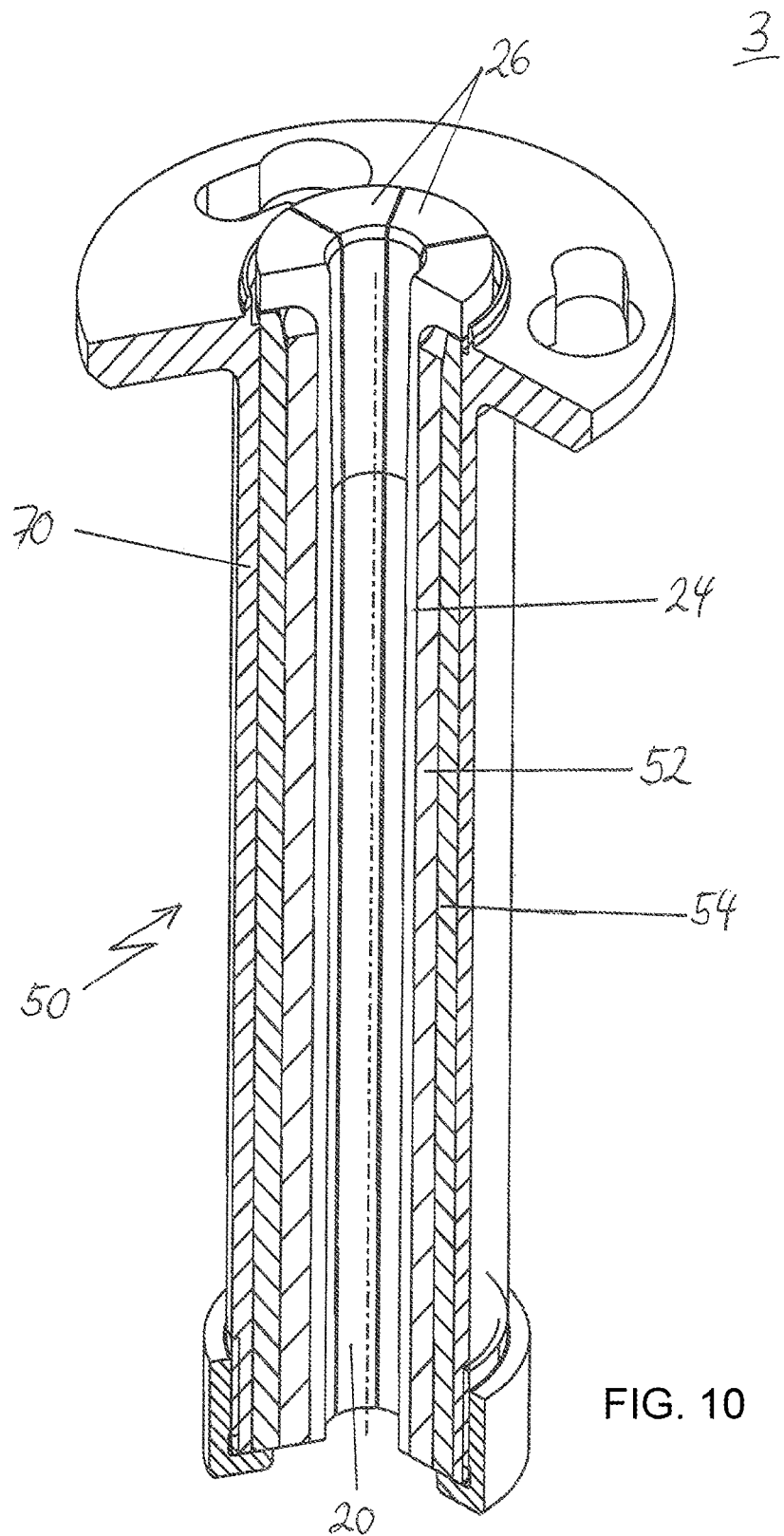
FIG. 10, 11 illustrate two further preferred embodiments of a head piece for a setting device.
Figure 11:
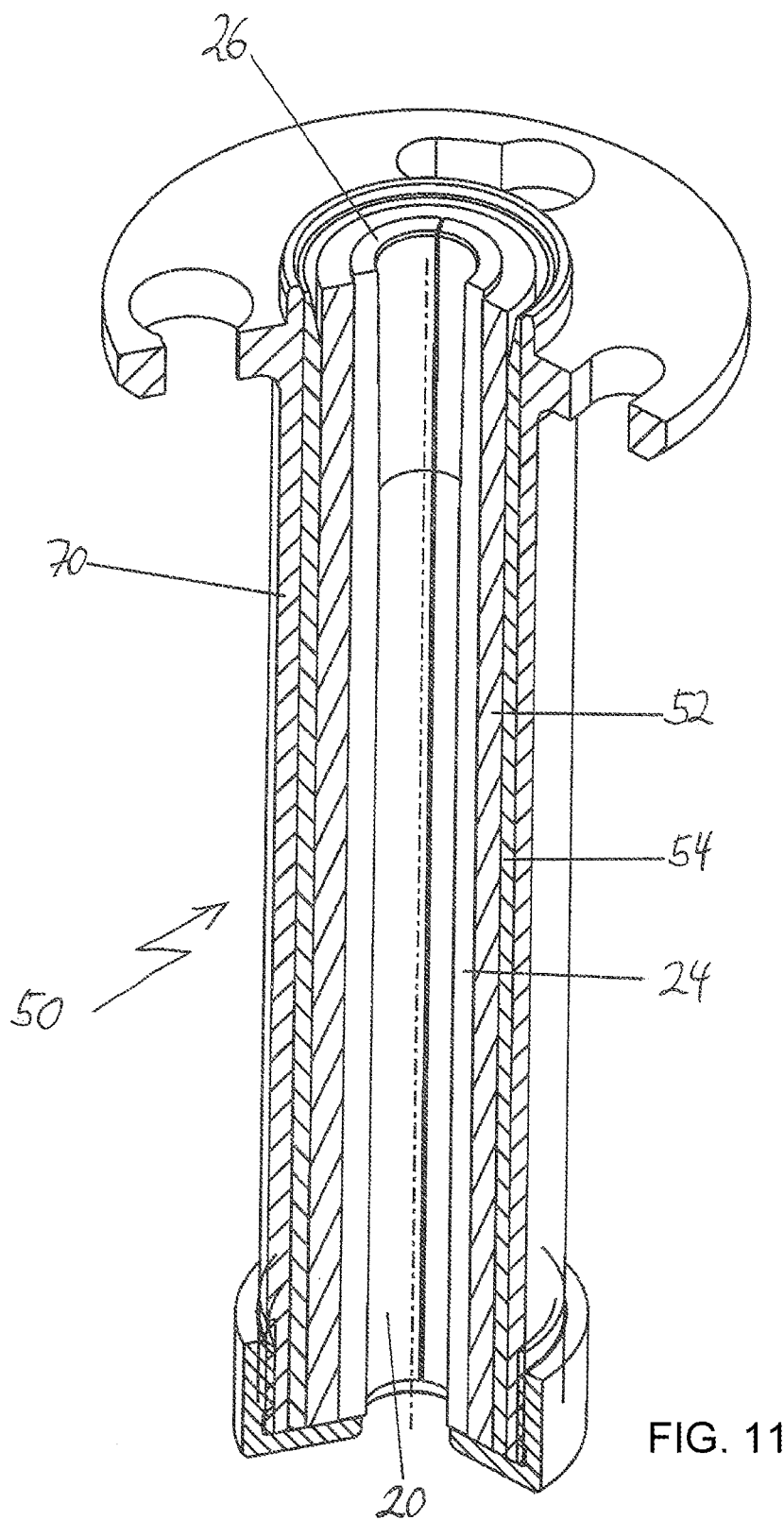

Further embodiments of the head piece 3 that can also be used with the setting device 1, are shown in FIGS. 10 and 11; the head pieces 3 of FIGS. 10 and 11 can be combined optimally with the suction device and/or the compressed air channels 62 with the compressed air source. Thereby, these head pieces 3 also guarantee the positioning described above, and a controlled guidance and braking of the setting fastener B.

The head piece 3 of the FIGS. 10 and 11 having a braking path 50 is comprised of a casing tube 70 which forms the outer enclosure of the head piece 3. The joining channel 20 is formed by an inner hollow cylinder 24, which is composed of a plurality of channel segments 26. Due to the discontinuity of the inner hollow cylinder 24 in the channel segments 26, these can yield radially outward, when they are loaded by the setting fastener B. The channel segments 26 are composed of a wear-resistant material, for example, plastic, hardened steel or ceramics. This guarantees low wear and reliable guidance of the setting fastener B moving through the joining channel 20.

A resilient damping layer 52 is disposed adjacent to the channel segments 26. The damping layer 52 damps a deflection movement of the channel segments 26 due to the setting fastener movement, and resets the respective channel segment 26, temporally delayed, into its initial position. A suitable material for the damping layer 52 is an elastomer, for example. However, other materials that have the damping and spring properties described above, are also suitable. It is further preferable to equip the damping layer 52 with a progressive spring characteristic, so that the desired damped deflection of the channel segments and their delayed return occurs as described above in connection with the springs.

A hollow cylinder 54 is optionally disposed between the casing tube 70 and the damping layer 52. The hollow cylinder 54 in the head piece 3 can be exchanged so that the hollow cylinder 54 can be used with different radial thicknesses. On this basis, the preloading or compression of the damping layer 52 can be adjusted or readjusted. The channel segments 26 resiliently damped in this manner thereby satisfy the function of the braking webs 42 described above. Due to the surfaces in the joining channel 20, the channel segments 26 offer larger support surfaces for the setting fastener B. In addition, a two-dimensional energy introduction into the damping layer 52 is provided when the channel segments 26 absorb the lateral movements of the setting fastener B. This guarantees a softer damping of the setting fastener B moving through the joining channel 20.

The method for the setting of setting fasteners implemented with the present invention can be summarized in the following steps. Initially, the auxiliary joining part B is fed loose into the joining channel 20 of the setting device 1. Then, an air stream to be positioned counter to the joining direction of the auxiliary joining part B in the joining channel 20 is generated by means of suction and/or feeding in air. As soon as this air stream is sufficiently strong, a positioning of the auxiliary joining part B occurs at the punch face side 13 of the punch 10. When the auxiliary joining part B is appropriately positioned, the joining process starts, and the punch 10, for joining of the auxiliary joining part B, moves through the joining channel 20 in the direction of the component to be joined.

The invention claimed is:

1. A head piece for a setting device having a joining channel that extends in a longitudinal direction of the head piece, while the head piece comprises:
   a) an inner hollow cylinder, within which the joining channel runs;
   b) a plurality of spring loaded braking webs, said braking webs being movable and projecting radially inwardly into the joining channel; and
   c) a plurality of springs, said springs comprising at least one of plastic and rubber O-rings for pretensioning said braking webs; and
   d) a casing tube surrounding the inner hollow cylinder such that the plurality of springs for the pretensioning of the braking webs are clamped between the inner hollow cylinder and the casing tube.

2. The head piece according to claim 1, wherein said inner hollow cylinder includes a plurality of channels, said channels opening into the joining channel that can be connected to at least one of the environment and to a compressed air source.

3. The head piece according to claim 2, wherein said plurality of channels open into the joining channel adjacent to a connection end for connecting the head piece to a setting device.

4. The head piece according to claim 2, further comprising a connecting end for connection to a setting device, said braking webs each being disposed in a longitudinal groove running through the inner hollow cylinder, said webs being fastened there via pins provided in an end region of the braking webs.

5. The head piece according to claim 1, further comprising a connecting end for connection to a setting device, said braking webs each being disposed in a longitudinal groove running through the inner hollow cylinder, said webs being fastened there via pins provided in an end region of the braking webs.

6. The head piece according to claim 1, wherein said plurality of springs are configured so that each braking web can be deflected damped, and can be reset, temporally delayed, into an initial position.

7. The head piece according to claim 6, in which multiple O-rings are combined into spring packets so that the braking webs are held with three uniformly distanced spring packets.

8. The head piece according to claim 1, wherein said plurality of springs are configured so that each braking web can be deflected with a progressive spring characteristic, and can be reset damped into an initial position.

9. A setting device for a fastener, said fastener being one of a setting bolt or a rivet, having a driven punch, which for a setting movement can be moved in a joining channel, into which the fastener can be fed loose, said setting device having a head piece made according to claim 1.

* * * * *